(12) United States Patent
Huang et al.

(10) Patent No.: US 8,757,194 B2
(45) Date of Patent: Jun. 24, 2014

(54) INFLATING VALVE ASSEMBLY

(76) Inventors: Ying-Che Huang, Changhua County (TW); Chun-Ming Huang, Changhua County (TW)

(*) Notice: Subject to any disclaimer, the term of this patent is extended or adjusted under 35 U.S.C. 154(b) by 85 days.

(21) Appl. No.: 13/553,268

(22) Filed: Jul. 19, 2012

(65) Prior Publication Data

US 2013/0105001 A1    May 2, 2013

(30) Foreign Application Priority Data

Oct. 26, 2011   (TW) .............................. 100138956 A

(51) Int. Cl.
*F16K 15/20*   (2006.01)

(52) U.S. Cl.
USPC ............................. 137/231; 137/223; 152/415

(58) Field of Classification Search
USPC .................. 137/223, 228, 230, 231, 233; 251/149.1, 149.4; 285/247, 354, 386, 285/353; 152/415
See application file for complete search history.

(56) References Cited

U.S. PATENT DOCUMENTS

| | | | | |
|---|---|---|---|---|
| 533,973 A * | 2/1895 | Tansley | ......................... | 137/231 |
| 566,811 A * | 9/1896 | Schindel | ....................... | 137/223 |
| 587,347 A * | 8/1897 | Waite | ............................ | 285/354 |
| 838,219 A * | 12/1906 | Stapley | .......................... | 137/231 |
| 1,209,213 A * | 12/1916 | Schneider | ..................... | 137/223 |
| 1,844,047 A * | 2/1932 | Smittle | ........................... | 285/353 |
| 2,473,120 A * | 6/1949 | Wolfram | ....................... | 285/354 |
| 3,037,544 A * | 6/1962 | Gouirand | ...................... | 152/415 |
| 4,295,672 A * | 10/1981 | Williams | ...................... | 285/386 |
| 5,762,732 A * | 6/1998 | Chapman | ...................... | 152/415 |
| 6,220,836 B1 * | 4/2001 | Wu | ............................... | 137/231 |
| 6,276,391 B1 * | 8/2001 | Wu | ............................... | 137/223 |
| 6,382,268 B1 * | 5/2002 | Lin | ............................... | 137/231 |
| 7,309,034 B2 * | 12/2007 | Huang | .......................... | 239/589 |
| 7,588,048 B2 * | 9/2009 | Huang | .......................... | 137/231 |
| 7,661,435 B2 * | 2/2010 | Huang | .......................... | 137/231 |
| 7,963,297 B2 * | 6/2011 | Huang et al. | .................. | 137/231 |
| 8,402,989 B2 * | 3/2013 | Chuang | ......................... | 137/231 |

\* cited by examiner

*Primary Examiner* — Craig Schneider
*Assistant Examiner* — Craig J Price
(74) *Attorney, Agent, or Firm* — Rabin & Berdo, P.C.

(57) ABSTRACT

A valve assembly includes a rotary nut unit having a threaded wall portion, a first wall portion near the threaded wall portion and defining a first shoulder, a second wall portion below the first wall portion and defining a second shoulder. A valve stem is disposed within the nut unit, has a lower portion projecting axially and outwardly from the lower end of the nut unit and an upper portion received in the second shoulder. The stem has an axial hole in spatial communication with an axial hole in the nut unit. The upper portion has a head part formed with first and second outward flanges defining a ring-reception recess therebetween. A leak-proof ring is sleeved around the ring-reception recess in the head part to abut hermetically against the second wall portion, thereby providing an air-proof effect between the leak-proof ring and the second wall portion.

5 Claims, 8 Drawing Sheets

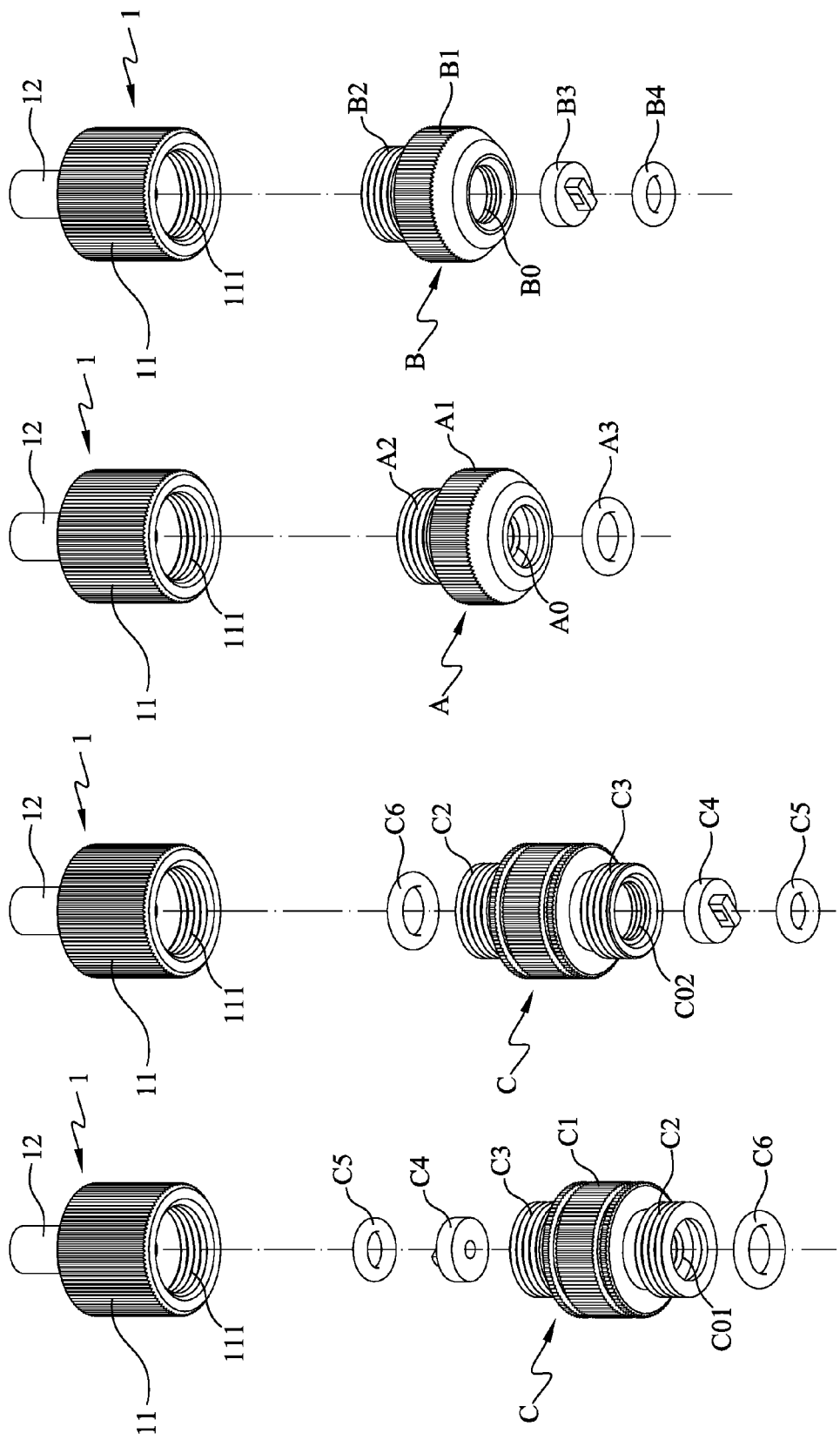

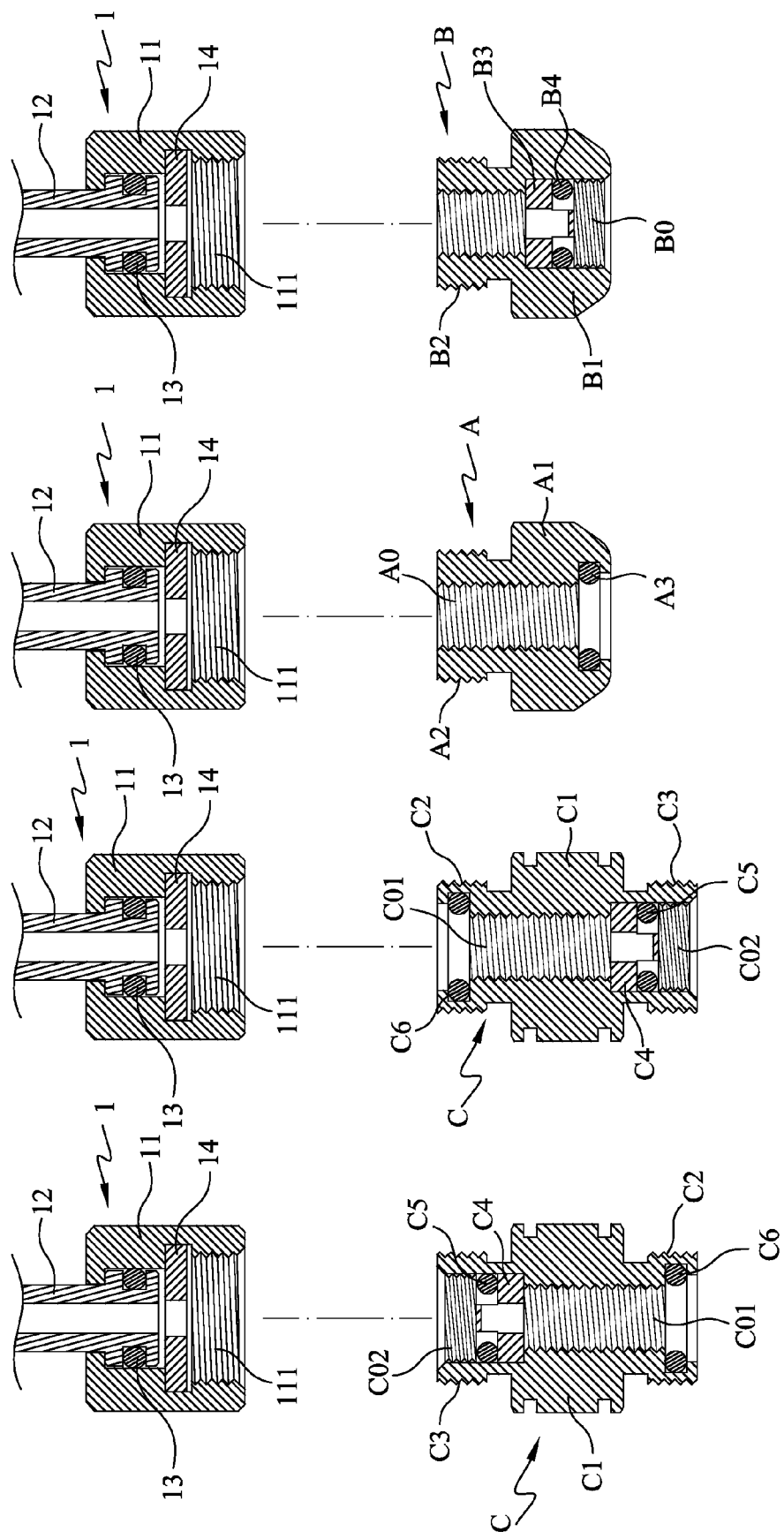

INFLATING VALVE ASSEMBLY

CROSS REFERENCE

This application claims the benefits of the Taiwan Patent Application NO. 100138956, filed on Oct. 26, 2011, the subject matter of which is incorporated herein by reference.

BACKGROUND OF THE INVENTION

1. Field of the Invention

The present invention relates to an inflating valve assembly, more particularly to an inflating valve assembly, which is adapted to be installed at an outlet vent of an air injection apparatus and which is adapted to complement with several types of adapters such that inflatable articles with different specification air inlets are inflated via the inflating valve assembly of the present invention upon activation of the air injection apparatus.

2. The Prior Arts

An inflating valve is usually installed to an inflatable article, such as motor car tire. When it is desired to pump air into the inflatable article, an air-outlet of an air injection apparatus is attached to the inflating valve such that the article is inflated upon activation of the air injection apparatus.

A conventional inflating valve generally includes a valve stem provided at an air inlet such that when no external is applied on the valve stem, the latter blocks the air inlet hermetically owing to the sufficient pressure within the inflated article so that the pressure within the inflated article is prevented from leaking to an exterior of the inflated article. In case, an external object applies pressure onto the valve stem, the latter retracts inwardly thereof, thereby opening the air inlet. Under this condition, the air within the inflated article can escape to an exterior and alternately air can be injected into an interior of the article upon activation of the air injection apparatus.

Presently, two types of inflating valve are available in the market, namely: (1) Schrader valve assembly (generally known as American valve), (2) Presta valve assembly (generally known as French valve). The French valve includes two-step thread portions (i.e. an outer large diameter thread portion and an outer small diameter thread portion proximate to the distal end and defining a shoulder between the large and small thread portions) while a valve stem projects outwardly from the air inlet of the inflatable article. The American valve includes an externally threaded portion for mating with an air injection apparatus and a valve stem retracts inwardly into the threaded portion.

The America valve is employed in a majority of the inflatable articles when compare to the French valve. If one desires to inject or pump air into an inflatable article provided with a French valve, an adapter compatible with the French valve is required to couple to the air outlet of the air injection apparatus. Only then, air can be injected into the inflatable article via the adapter upon activation of the air injection apparatus. Of course, nowadays there are some air injection apparatuses or air pumps provided with French valves for the consumers to pick and choose. However, in case one desires to inject air into an inflatable article provided with an American valve, another adapter compatible with the American valve is required to couple with the air outlet of the air injection apparatus. Only then, air can be injected into the inflatable article via another adapter upon activation of the air injection apparatus.

As mentioned above, there are adapters with single function (i.e. compatible with French valve or American valve). There is yet another adapter, which is compatible with French valve and American valve simultaneously. Regardless of the inflatable article is provided French valve or American valve, an adapter is still required for the air injection apparatus to pump air into an inflatable article provided with inflating valves of different specifications. However, it is noted that the construction structure of French valve or American valve includes several parts and is complicated to assemble, hence leading to high manufacturing expense for the manufacturers.

SUMMARY OF THE INVENTION

Therefore, the objective of the present invention is to provide an inflating valve assembly that has simple structure, that is adapted to be coupled with an American valve and a French valve so as to inject air into an inflatable article and that causes lower manufacturing expense for the manufacturers.

Another object of the present invention is to provide an inflating valve assembly, which is adapted to be coupled with an adapter compatible with America valve or French valve such that an inflatable article provide with an American valve or a French valve can be inflated, thereby avoiding the problem of buying the adapters of different specifications and saving the undesired expense for the users.

The inflating valve assembly of the present includes a rotary nut unit, a valve stem and an annular leak-proof ring. The rotary nut unit has opposite upper and lower ends, an inner wall defining an axial hole extending through the upper and lower ends. The inner wall has a threaded wall portion proximate to the upper end, a first wall portion that is located adjacent to the threaded wall portion, that is distal from the upper end and that defines a first diameter, a second wall portion located immediately below the first wall portion and defining a second diameter. The first diameter of the first wall portion is greater than the second diameter of the second wall portion and a diameter defined by the threaded wall portion, thereby forming a first shoulder between the first and second wall portions. The axial hole of the nut unit defines a third diameter such that the second diameter of the second wall portion is greater than the third diameter and is smaller than the diameter of the threaded wall portion, thereby forming a second shoulder between the second wall portion and the axial hole in the nut unit. The valve stem is disposed axially within the nut unit, has a lower portion projecting axially and outwardly from the lower end of the nut unit and an upper portion received in the second shoulder of the second wall portion. The valve stem further has an axial inflating hole extending through the upper and lower portions and in spatial communication with the axial hole in the nut unit, and an outer diameter smaller than the third diameter of the axial hole in the nut unit. The upper portion of the valve stem further has a head part formed with first and second flanges projecting radially and outwardly therefrom and cooperatively defining a ring-reception recess therebetween. The first and second flanges cooperatively define an outer diameter that is greater than the third diameter but smaller than the second diameter of the second wall portion. The leak-proof ring is sleeved around the ring-reception recess in the head part in such a manner to abut hermetically against the second wall portion, thereby providing an air-proof effect between the leak-proof ring and the second wall portion. The inflating valve assembly of the present invention further includes an elastic washer with a central hole disposed on the first shoulder of the first wall portion, and has an outer diameter that is smaller than the first diameter of the first wall portion and that is greater than the diameter of the threaded wall portion in the nut unit. The central hole of the elastic washer is in spatial communication with the axial hole in the nut unit and the axial inflating hole in the valve stem.

Preferably, the valve stem further includes a stack structure disposed on an exterior surface of the lower portion thereof. When the lower portion of the valve stem is inserted into a flexible tube of an air injection apparatus, the stack structure provides friction between the valve stem and the flexible tube to engage the two elements. A clamp member is sleeved around the flexible tube for further securing the flexible tube relative to the valve stem so as to prevent untimely disengagement of the valve stem from the flexible tube.

In another aspect of the invention, the lower portion of the valve stem is formed with external engagement teeth for engaging the internal teeth formed within an air outlet of an air injection apparatus, such as manually operated air pump for inflating bicycle tube.

BRIEF DESCRIPTION OF THE DRAWINGS

Other features and advantages of this invention will become more apparent in the following detailed description of the preferred embodiments of this invention, with reference to the accompanying drawings, in which:

FIG. 4A to FIG. 4D shows the inflating valve assembly of the present invention, which is adapted to be coupled with an adapter compatible to French valve or American valve;

FIG. 5A to FIG. 5D shows cross-sectional views of the inflating valve assembly of the present invention, which is adapted to be coupled with an adapter compatible to French valve or American valve;

DETAILED DESCRIPTION OF THE PREFERRED EMBODIMENTS

Figure 1:
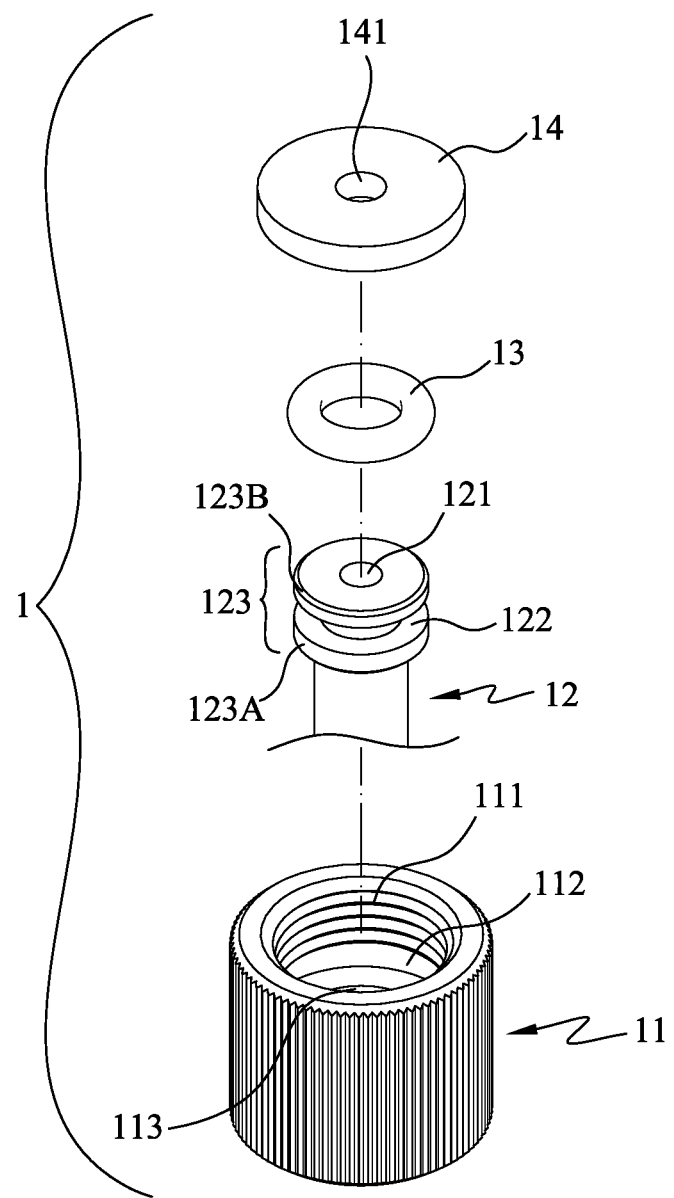
FIG. 1 shows an exploded and perspective view of an inflating valve assembly of the present invention.
Figure 2:
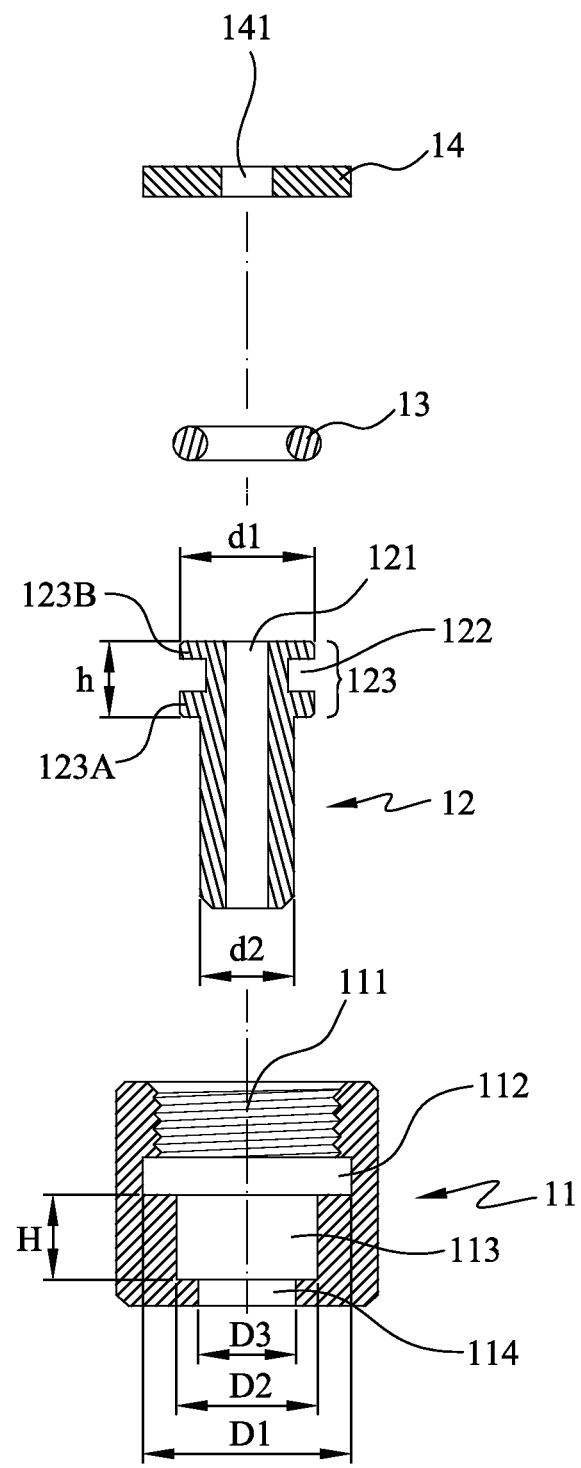
FIG. 2 shows exploded and cross-sectional views of the inflating valve assembly of the present invention.
Figure 3:
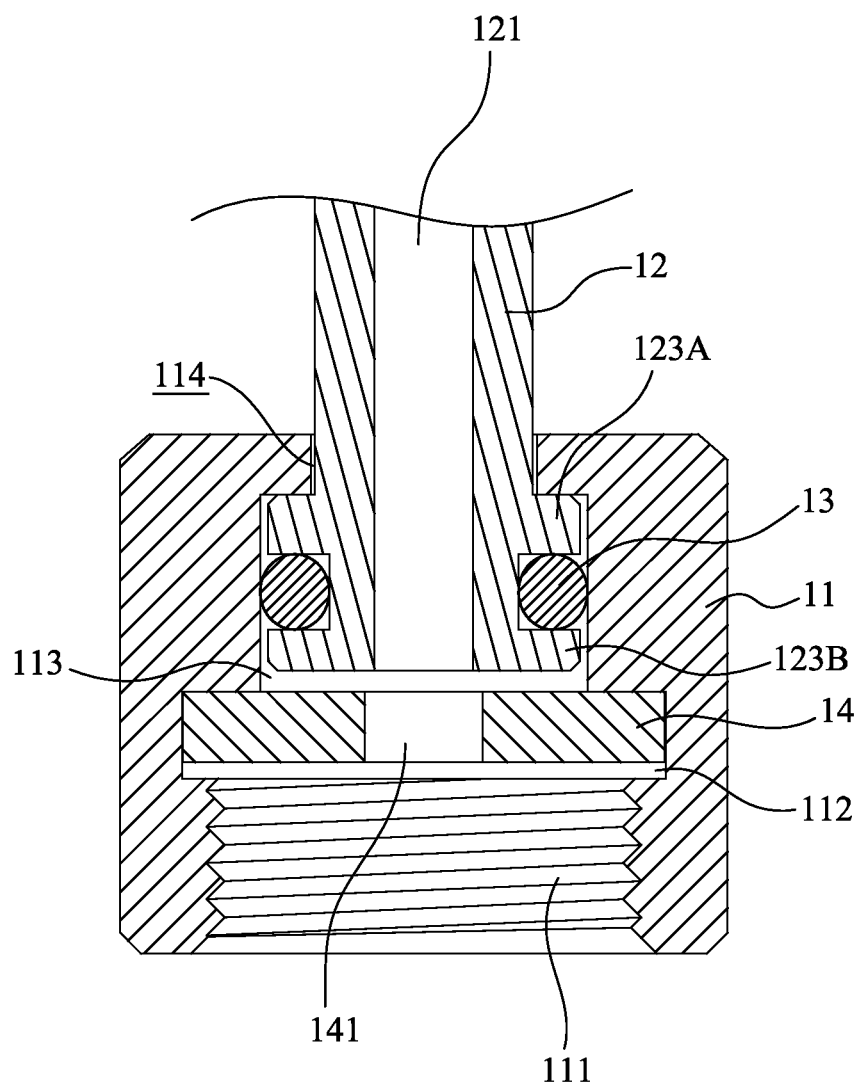
FIG. 3 shows a cross-sectional view of the inflating valve assembly of the present invention.

Referring to FIGS. 1 to 3, wherein FIG. 1 shows an exploded and perspective view of an inflating valve assembly of the present invention; FIG. 2 shows exploded and cross-sectional views of the inflating valve assembly of the present invention while FIG. 3 shows a cross-sectional view of the inflating valve assembly of the present invention. As illustrated, the inflating valve assembly 1 of the present invention includes a rotary nut unit 11, a valve stem 12, an annular leak-proof ring 13 and an elastic washer 14 (made from rubber materials or plastic materials). The rotary nut unit 11 is cylindrical shaped, has opposite upper and lower ends, an inner wall defining an axial hole 114 extending through the upper and lower ends. The inner wall has a threaded wall portion 111 proximate to the upper end, a first wall portion 112 that is located adjacent to the threaded wall portion 111, that is distal from the upper end and that defines a first diameter D1, a second wall portion 113 located immediately below the first wall portion 112 and defining a second diameter D2, wherein the first diameter D1 of the first wall portion 112 is greater than the second diameter D2 of the second wall portion 113, and a diameter defined by the threaded wall portion 111, thereby forming a first shoulder between the first and second wall portions 112, 113. The diameter defined by the threaded wall portion 111 is greater than an external diameter of the air outlet of a mating French valve F or American valve U (shown in the following drawings FIGS. 6A to 6C). The axial hole 114 defines a third diameter D3 such that the second diameter D2 of the second wall portion 113 is greater than the third diameter and is smaller than the diameter of the threaded wall portion 111, thereby forming a second shoulder between the second wall portion 113 and the axial hole in the nut unit. The second wall portion 113 has an axial length (H). The valve stem 12 is disposed axially within the nut unit 11, and has a lower portion projecting axially and outwardly from the lower end of the nut unit 11 and an upper portion received in the second shoulder of the second wall portion 113. The valve stem 12 further has an axial inflating hole 121 extending through the upper and lower portions in spatial communication with the axial hole 114 in the nut unit 11. The valve stem 12 has an outer diameter d2 smaller than the third diameter D3 of the axial hole 114 in the nut unit 11. The upper portion of the valve stem 12 further includes a head part 123 with an axial length (h) shorter than the axial length (H) of the second wall portion 113. The head part 123 is further formed with first and second flanges (123A, 123B) extending radially and outwardly therefrom and cooperatively defining a ring-reception recess 122 between the first and second flanges (123A, 123B). The first and second flanges (123A, 123B) cooperatively define an outer diameter d1 that is greater than the third diameter D3 but is smaller than the second diameter D2 of the second wall portion 113. The leak-proof ring 13 is sleeved around the ring-reception recess 122 in the head part 123 in such a manner to abut hermetically against the second wall portion 113, thereby providing an air-proof effect between the leak-proof ring 13 and the second wall portion 113.

As illustrated above, for assembling the inflating valve assembly 1 of the present invention, the following steps should be conducted. First of all, the leak-proof ring 13 is sleeved around the ring-reception recess 122 in the head part 123 of the valve stem 12 and the latter is inserted from an upper side into the nut unit 11 such that the lower portion of the valve stem 12 projects axially and outwardly from the lower end of the nut unit 11 while the head part 123 is seated on the second shoulder of the second wall portion 113. The inflating valve assembly 1 of the present invention further includes an elastic washer 14 with a central hole 141 inserted via the threaded wall portion 111 so as to be seated on the first shoulder of the first wall portion 112, thereby preventing untimely disengagement of the valve stem 12 from the nut unit 11. Under this condition, the leak-proof ring 13 abuts hermetically against the second wall portion 113 owing to its characteristics of the materials, thereby providing an airproof effect between the leak-proof ring 13 and the second wall portion 113. The elastic washer 14 has an outer diameter that is smaller than the first diameter D1 of the first wall portion 112 and that is greater than the diameter of the threaded wall portion 111 in the nut unit 11. The central hole 141 of the elastic washer 14 is in spatial communication with the axial hole 114 in the nut unit 11 and the axial inflating hole 121 in the valve stem 12.

Figure 7:
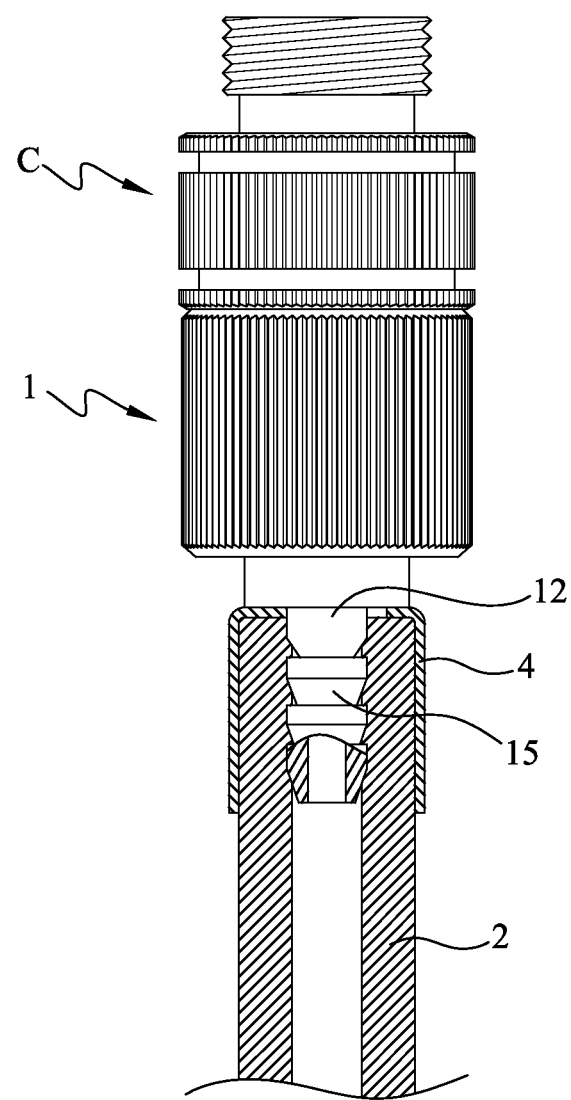
FIG. 7 shows cross-sectional views of the inflating valve assembly of the present invention, which is adapted to couple with a flexible tube, the assembly thereof is adapted to be coupled with is coupled with an adapter compatible to American valve and French valve.

The inflating valve assembly 1 of the present invention can be installed at an air outlet of an inflatable article, as best shown in FIG. 7, wherein the valve stem 12 further includes a stack structure 15 disposed on an exterior surface of the lower portion of the valve stem 12. The stack structure 15 preferably includes a plurality of hollow truncated cones that are sleeved around the lower portion of the valve stem 12 and that are stacked over one another such that when the lower portion of the valve stem 12 is inserted into a flexible tube 2 of an air injection apparatus, the truncated cones provide friction between the valve stem 12 and the flexible tube 2 to engage the two elements. A clamp member 4 is sleeved around the flexible tube 2 for further securing the flexible tube 2 relative to the valve stem 12 so as to prevent untimely disengagement of the valve stem 12 from the flexible tube 2.

Figure 8:
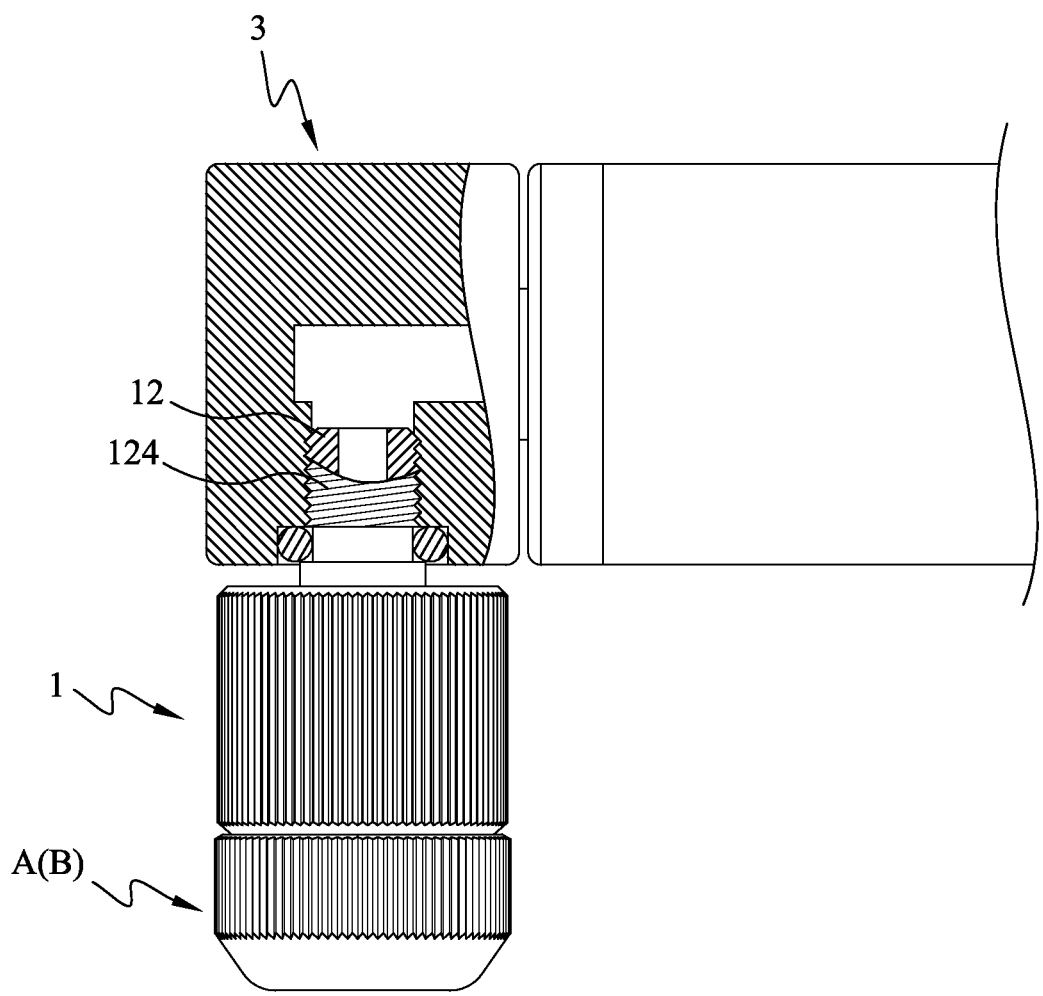
FIG. 8 shows cross-sectional views of the inflating valve assembly of the present invention, which is adapted to couple with an adapter compatible to American valve or French valve.

FIG. 8 shows cross-sectional views of the inflating valve assembly of the present invention, wherein the lower portion of the valve stem 12 is formed with external engagement teeth 124 which is adapted to couple threadedly with an air outlet of an air injection apparatus 3. Note that the air outlet of the air injection apparatus 3 is formed with internal engagement teeth for engaging the external engagement teeth 124 of the valve stem 12.

Referring to FIGS. 4 to 6, wherein FIG. 4C and FIG. 5C show the inflating valve assembly 1 of the present invention, which is adapted to be coupled with an adapter A compatible to French valve. As illustrated, the adapter A includes a main body A1 having a second portion provided with external engagement teeth A2, an axially extending inner threaded wall AO extending through the first and second portion and a seal ring A3 disposed in the inner threaded wall AO such that when the second portion A2 is engaged threadedly with the threaded wall portion 111 in the nut unit 11, the second portion A2 abuts hermetically against the washer 14 of the inflating valve assembly 1 of the present invention, as best shown in FIG. 6C, thereby providing a leak-proof effect therebetween. At this time, the threaded head of a French valve F is inserted threadedly into the inner threaded wall AO in the main body A1 of the adapter A, hence injection of air into a desired inflatable article can be carried out when an air injection apparatus is coupled to the adapter A.

Figure 6D:
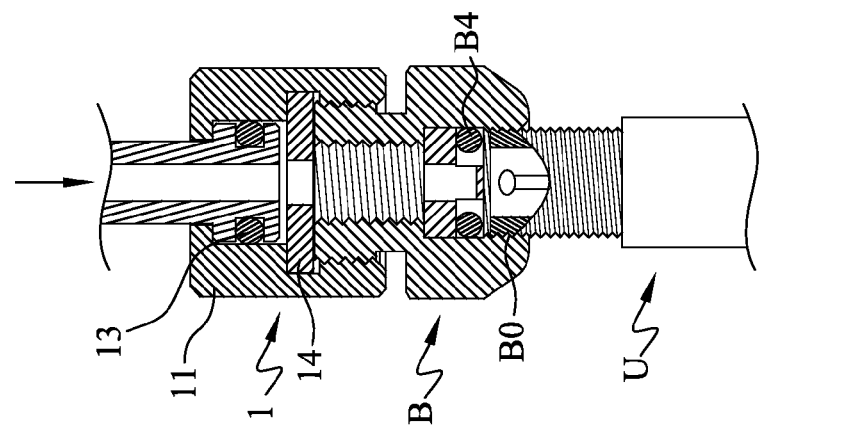
FIG. 6D shows cross-sectional views of the inflating valve assembly of the present invention, which is coupled with an adapter compatible to American valve, the assembly thereof is coupled to an inflatable article provided with American valve.
Figure 6C:
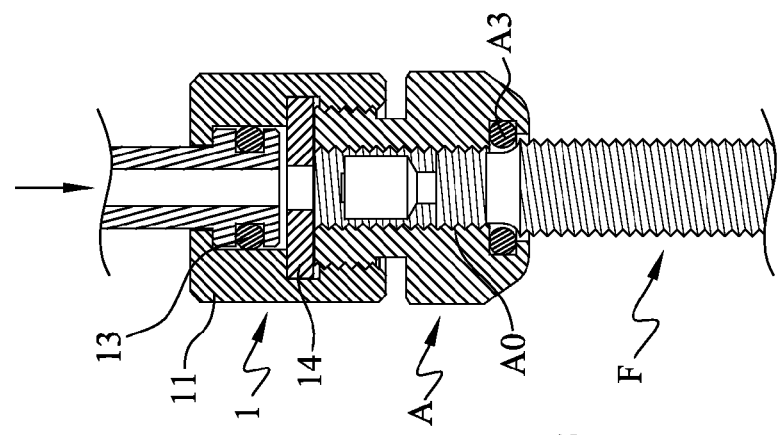
FIG. 6C shows cross-sectional views of the inflating valve assembly of the present invention, which is coupled with an adapter compatible to French valve, the assembly thereof is coupled to an inflatable article provided with French valve.

Referring to FIGS. 4 and 5, wherein FIG. 4D and FIG. 5D show the inflating valve assembly 1 of the present invention, which is adapted to be coupled with an adapter B compatible to American valve. As illustrated, the adapter B includes a main body B1 having a second portion provided with external engagement teeth B2, an axially extending inner threaded wall B0 formed through a first portion, a valve block B3 and a seal ring B3 disposed sequentially within the inner threaded wall B0 such that when the second portion B2 is engaged threadedly with the threaded wall portion 111 in the nut unit 11, the second portion B2 abuts hermetically against the washer 14 of the inflating valve assembly 1 of the present invention, as best shown in FIG. 6D, thereby providing a leak-proof effect therebetween. At this time, the threaded head of an American valve U is inserted threadedly into the inner threaded wall B0 in the main body B1 of the adapter B, hence injection of air into a desired inflatable article can be carried out when an air injection apparatus is coupled to the adapter B.

Figure 6B:
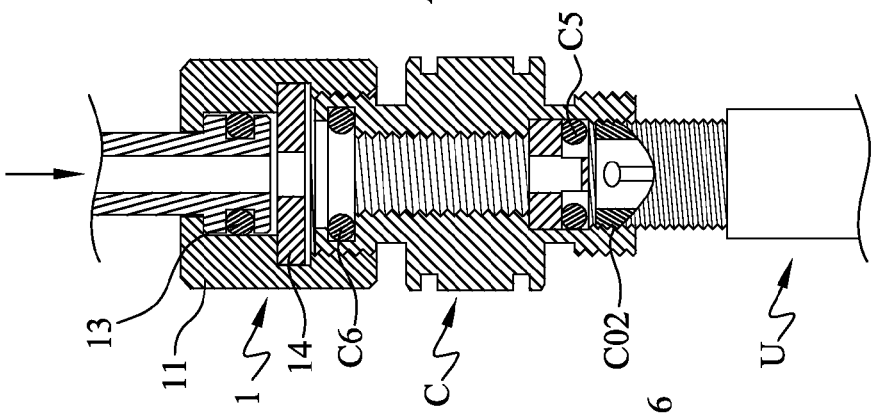
FIG. 6B shows cross-sectional views of the inflating valve assembly of the present invention, which is coupled with an adapter compatible to French valve and American valve, the assembly thereof is coupled to an inflatable article provided with American valve.
Figure 6A:
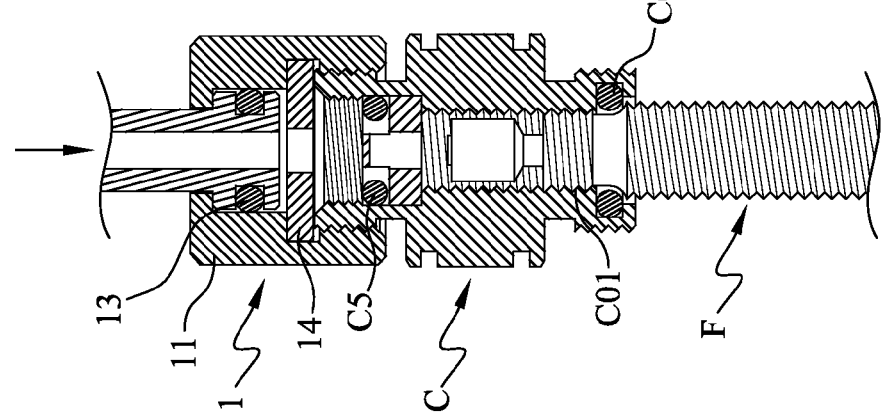
FIG. 6A shows cross-sectional views of the inflating valve assembly of the present invention, which is coupled with an adapter compatible to French valve and American valve, the assembly thereof is coupled to an inflatable article provided with French valve.

Referring again to FIGS. 4 and 5, wherein FIGS. 4A and 4B, FIGS. 5A and 5B show the inflating valve assembly 1 of the present invention, which is adapted to be coupled with an adapter C compatible to American valve and French valve. As illustrated, the adapter C includes a main body C1 having opposite first and second portions provided with first and second external engagement teeth (C2, C3), an axially extending first inner threaded wall C01 formed through the first portion and a seal ring C6 disposed in the first inner threaded wall C01. The second portion of the main body C1 has an axially extending second inner threaded wall C02, a valve block C4 and a seal ring C5 disposed sequentially within the second inner threaded wall C02 such that when the second portion C3 is engaged threadedly with the threaded wall portion 111 in the nut unit 11, the second portion C3 abuts hermetically against the washer 14 of the inflating valve assembly 1 of the present invention, as best shown in FIG. 6A, thereby providing a leak-proof effect therebetween. At this time, the threaded head of a French valve F is inserted threadedly into the inner threaded wall C01 in the main body C1 of the adapter C, hence injection of air into a desired inflatable article can be carried out when an air injection apparatus is coupled to the adapter C. Alternately and as illustrated in FIG. 6B, the main body C1 of the adapter C is turned upside down such that the first portion C2 extends upward and is engaged threadedly with the threaded wall portion 111 in the nut unit 11, where the first portion C2 abuts hermetically against the washer 14 of the inflating valve assembly 1 of the present invention, thereby providing a leak-proof effect therebetween. At this time, the threaded head of an American valve U is inserted threadedly into the inner threaded wall C02 in the main body C1 of the adapter C, hence injection of air into a desired inflatable article can be carried out when an air injection apparatus is coupled to the adapter C.

Generally, a conventional air injection apparatus 3 or a flexible 2 are required for coupling with the inflating valve assembly 1 of the present invention in order to inflate a desired inflatable article, such as car tire. In addition, the adapter of several specifications can be coupled with the inflating valve assembly 1 of the present invention for injecting air into inflatable articles provided with French valve, American valve or Ball valve (standard valve of Great Britain), thereby saving the expenses for buying several adapters of different specifications and simultaneously eliminating the problems and difficulties as mentioned in the background of the related art.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An inflating valve assembly comprising:
   a rotary nut unit having opposite upper and lower ends, an inner wall defining an axial hole extending through said upper and lower ends, said inner wall having a threaded wall portion proximate to said upper end, a first wall portion that is located adjacent to said threaded wall portion, that is distal from said upper end and that defines a first diameter, a second wall portion located immediately below said first wall portion and defining a second diameter, wherein said first diameter of said first wall portion and a diameter of the threaded wall portion are greater than said second diameter of said second wall portion, thereby forming a first shoulder between said first and second wall portions, said axial hole defining a third diameter such that said second diameter of said second wall portion is greater than said third diameter and is smaller than said diameter of said threaded wall portion, thereby forming a second shoulder between said second wall portion and said axial hole;

a valve stem disposed axially within said nut unit, having a lower portion projecting axially and outwardly from said lower end of said nut unit and an upper portion received in said second shoulder of said second wall portion, said valve stem further having an axial inflating hole extending through said upper and lower portions and in spatial communication with said axial hole in said nut unit, and an outer diameter smaller than said third diameter of said axial hole in said nut unit, said upper portion of said valve stem further having a head part formed with first and second flanges projecting radially and outwardly therefrom and cooperatively defining a ring-reception recess therebetween, said first and second flanges cooperatively defining another outer diameter that is greater than said third diameter but smaller than said second diameter of said second wall portion; and a leak-proof ring sleeved around said ring-reception recess in said head part in such a manner to abut hermetically against said second wall portion, thereby providing an air-proof effect between said leak-proof ring and said second wall portion.

2. The inflating valve assembly according to claim 1, further comprising an elastic washer with a central hole disposed on said first shoulder of said first wall portion, and having an outer diameter that is smaller than said first diameter of said first wall portion and that is greater than said diameter of said threaded wall portion in said nut unit, said central hole of said elastic washer being in spatial communication with said axial hole in said nut unit and said axial inflating hole in said valve stem.

3. The inflating valve assembly according to claim 1, wherein said first diameter of said first wall portion is greater than the diameter of the threaded wall portion.

4. The inflating valve assembly according to claim 1, wherein said valve stem further includes a stack structure disposed on an exterior surface of said lower portion thereof.

5. The inflating valve assembly according to claim 3, wherein said lower portion of said valve stem is formed with external engagement teeth.

* * * * *